United States Patent
De Meulder (10) Patent No.: US 11,334,340 B2
(45) Date of Patent: May 17, 2022

(54) AIRCRAFT SOFTWARE MANAGEMENT SYSTEM

(71) Applicant: Aerion Intellectual Property Management Corporation, Palo Alto, CA (US)

(72) Inventor: David J. De Meulder, Richmond Hill, GA (US)

(73) Assignee: Aerion Intellectual Property Management Corporation, Palo Alto, CA (US)

( * ) Notice: Subject to any disclaimer, the term of this patent is extended or adjusted under 35 U.S.C. 154(b) by 60 days.

(21) Appl. No.: 16/839,171

(22) Filed: Apr. 3, 2020

(65) Prior Publication Data

US 2021/0311713 A1 Oct. 7, 2021

(51) Int. Cl.
| | |
|---|---|
| *G06F 8/65* | (2018.01) |
| *G06F 8/71* | (2018.01) |
| *B64F 5/60* | (2017.01) |
| *G07C 5/00* | (2006.01) |
| *H04L 29/06* | (2006.01) |

(52) U.S. Cl.
CPC .................. *G06F 8/65* (2013.01); *B64F 5/60* (2017.01); *G06F 8/71* (2013.01); *G07C 5/006* (2013.01); *G07C 5/008* (2013.01); *H04L 63/166* (2013.01)

(58) Field of Classification Search
CPC ........................................................ G06F 8/65
See application file for complete search history.

(56) References Cited

U.S. PATENT DOCUMENTS

| | | | | |
|---|---|---|---|---|
| 6,728,610 | B1* | 4/2004 | Marshall | G01M 15/00 701/29.6 |
| 2002/0143443 | A1* | 10/2002 | Betters | G06Q 10/06 701/32.1 |
| 2004/0106404 | A1* | 6/2004 | Gould | G06F 8/65 455/431 |
| 2010/0152928 | A1* | 6/2010 | Aymeric | G01C 23/005 701/3 |
| 2013/0067450 | A1* | 3/2013 | Saugnac | H04L 41/082 717/170 |
| 2013/0073419 | A1* | 3/2013 | Marwedel | B64F 5/60 705/26.5 |
| 2015/0367960 | A1* | 12/2015 | Dyanzio | B64F 1/228 701/28 |
| 2016/0065479 | A1* | 3/2016 | Harper | H04L 47/125 370/235.1 |

(Continued)

*Primary Examiner* — Jae U Jeon
(74) *Attorney, Agent, or Firm* — Hovey Williams LLP (57) ABSTRACT

An aircraft maintenance system for improving updates and maintenance of computing devices and software systems of aircraft includes an onboard maintenance device, a centralized configuration server, and a master server. The onboard maintenance device is disposed in an aircraft. The centralized configuration server is communicatively coupled with the onboard maintenance device via satellite communication. The centralized configuration server is configured to wirelessly receive a current configuration report from the onboard maintenance device while the aircraft is in flight. The master server is disposed behind a firewall and is configured to send a set of up-to-date configuration data to the centralized configuration server such that the centralized configuration server can determine compliance by the aircraft.

20 Claims, 5 Drawing Sheets

(56) References Cited

U.S. PATENT DOCUMENTS

2016/0205724 A1* 7/2016 Shi ........................ H04W 92/02
　　　　　　　　　　　　　　　　　　　　　　　　　 370/254
2016/0352412 A1* 12/2016 Di Costanzo ...... H04N 21/2146
2017/0199517 A1* 7/2017 DiPippo ................. G06Q 10/00

* cited by examiner

AIRCRAFT SOFTWARE MANAGEMENT SYSTEM

BACKGROUND

Computing devices and related software systems in aircraft are traditionally updated and maintained manually by maintenance personnel. These maintenance personnel will manually load software updates and other information onto a laptop computer or other mobile computing device, physically travel to the aircraft, physically connect the computing device to a port on a computing device of the aircraft, and then upload the software updates to the computing device of the aircraft.

This traditional method of updating and maintaining aircraft computing devices and software systems is disadvantageous for several reasons. First, the physical travel to each aircraft to be updated and maintained is time consuming and inefficient. Second, the maintenance personnel must wait in the aircraft during the updating of the software. Third, the maintenance personnel have limited or no knowledge of the interplay of various hardware and software and how this can affect the aircraft performance. Fourth, the original equipment manufacturer is typically not involved in the updating and maintenance of the computing devices and software systems after the aircraft has been sold, even though the manufacturer has the most information about the components and operation of the aircraft.

SUMMARY

Embodiments of the present technology provide devices and methods of improving updates and maintenance of computing devices and software systems of aircraft and other vehicles. The present technology eliminates many manual tasks performed by maintenance personnel so as to provide functions and advantages beyond what humans can provide. Embodiments of the invention allow for continuous and/or reduced interval updates and maintenance, such as at the startup of the aircraft, periodically during operation, or at other times that a maintenance personnel could perform. Further, embodiments of the invention can account for the settings of the various hardware and software systems to ensure that the aircraft systems are working together correctly. Embodiments of the invention are run by or otherwise associated with the aircraft manufacturer and/or manufacturers of hardware and software systems in the aircraft, such that the manufacturer can determine acceptable and/or recommended configurations for the specific aircraft and/or hardware/software.

A first embodiment of the invention is a system for updating and maintaining aircraft computing devices and software systems and comprises an onboard maintenance device, a centralized configuration server, and a master server. The onboard maintenance device is disposed in an aircraft. The centralized configuration server is communicatively coupled with the onboard maintenance device via satellite communication. The centralized configuration server is configured to wirelessly receive a current configuration report from the onboard maintenance device while the aircraft is in flight. The master server is disposed behind a firewall and is configured to send a set of up-to-date configuration data to the centralized configuration server such that the centralized configuration server can determine compliance by the aircraft.

A second embodiment of the invention is a computerized method for updating and maintaining computing devices and software systems of a fleet of aircraft, the computerized method comprising the following steps: acquiring, from a master server, a set of up-to-date configuration data; storing, in a centralized configuration data store, said set of up-to-date configuration data; acquiring, from an operating aircraft, a current configuration report indicative of a current configuration setting of an electronic device on the aircraft; comparing the current configuration report of the aircraft to the set of up-to-date configuration data; determining, based upon said comparison, that the aircraft is not compliant with the set of up-to-date configuration data; and wirelessly sending an alert of non-compliance to the operating aircraft instructing a remedial action.

A third embodiment of the invention is a computerized method for updating and maintaining aircraft computing devices and software systems, the computerized method comprising the following steps: entering an operational mode associated with an operational aircraft; preparing a current configuration report indicative of a current configuration setting of an electronic device; wirelessly sending the current configuration report to a centralized configuration server; receiving, from the centralized configuration server, an alert of non-compliance; and taking a remedial action based at least in part on said alert of non-compliance.

Other embodiments of the present invention may be directed to any of the computerized components discussed herein, such as the onboard maintenance device, the centralized configuration server, and the master server (alone or in any combination). Still other embodiments of the present invention may be directed to a computerized method of the master server. Yet still other embodiments of the invention may be directed to a non-transitory computer readable storage medium, having a computer program stored on, wherein the computer program instructs at least one processing element to perform one or more of the steps discussed herein.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein.

While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Exemplary Environment and System

Embodiments of the present technology relate to improving the updating and maintaining aircraft computing devices and software systems in aircraft by providing a system, device, and/or method for providing and maintaining correct and allowable software and hardware configuration for aircraft. The system may include any of various devices, which may perform one or more of the below-discussed steps. The steps discussed herein provide advantages over the prior art and include steps that are not capable of being performed by a human. Further, the steps are tied to specialized computer hardware in aircraft.

While aircraft are traditionally maintained manually by maintenance personnel, embodiments of the invention provide improvements by automating the process, so as to provide advantages and steps that would not be possible with the maintenance personnel. These maintenance personnel manually load software updates and other information onto a laptop computer or other mobile computing device. The maintenance personnel will physically travel to the aircraft, and physically connect the computing device to a port on a computing device of the aircraft. The maintenance personnel upload the software updates to the computing device of the aircraft. The systems and methods described herein do not require the maintenance personnel to travel to the aircraft, such that the aircraft may be updated and confirmed at shorter intervals. Updates may be uploaded and checked more often, so as to ensure the aircraft includes the latest software updates. The system also allows for the configuration to be remotely and independently verified.

A fleet of aircraft may include various types of aircraft. In some embodiments, the fleet (as discussed herein) may include aircraft from a single manufacturer. In this way, the manufacturer can continue to ensure that their aircraft are utilizing proper hardware and/or software configurations. This is in contrast to the common practice of manufacturers selling their aircraft (or other products) and then relying on the customer to utilize only the proper hardware and/or software configurations. This is a burden on the customer as new hardware and software options become available after purchase. The manufacturer will continue to determine what hardware and/or software configurations are acceptable and/or recommended for their aircraft. Thus, embodiments of the invention may be offered as a continuing service for customers of the manufacturer. The continuing service may be included in the cost of the aircraft, or as a subscription service for a fee.

In other embodiments, the fleet of aircraft may include aircraft owned by a certain airline or other organization. The airline will determine certain hardware and/or software configurations for their aircraft (which may be determined by the make, model, type, and/or manufacture date of the aircraft). In still other embodiments, the fleet of aircraft may include aircraft that are based out of, flying out of, or otherwise associated with a certain airport. In these embodiments, the airport may require that the aircraft associated therewith verify that their hardware and/or software configurations are compliant with the acceptable standards.

Figure 1:
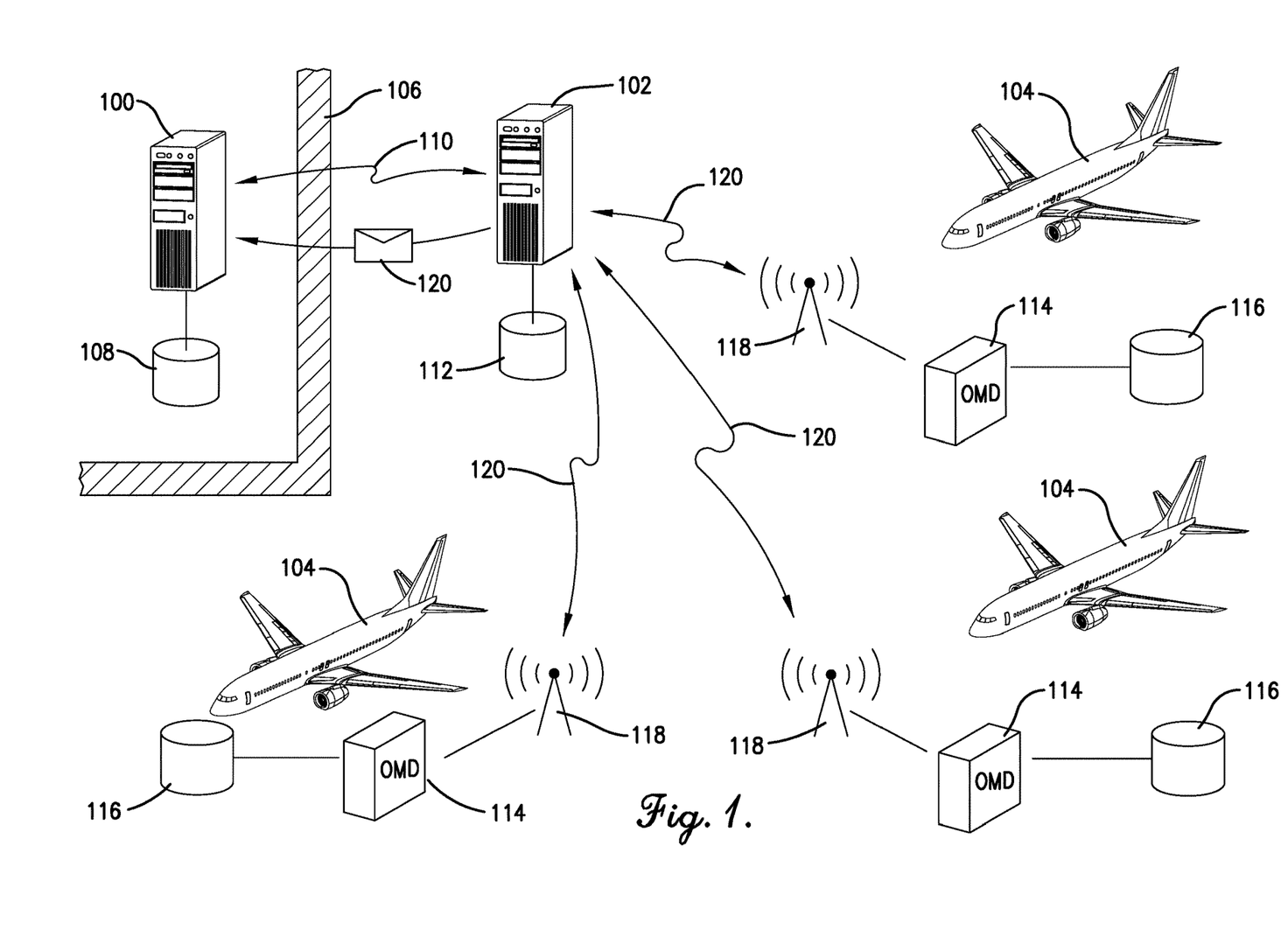
FIG. 1 is a system diagram illustrating various hardware components of systems of the invention configured to maintain a fleet of aircraft.

Turning to FIG. 1, a system of some embodiments of the invention is shown. The system includes a master server 100 communicatively coupled with a centralized configuration server 102. The centralized configuration server 102 is communicatively coupled to one or more aircraft 104. The centralized configuration server 102 communicates with the aircraft 104 to ensure up-to-date and acceptable configuration of the hardware and software of the aircraft 104. The centralized configuration server 102 is separated from the master server 100 by a firewall 106. Also, behind the firewall 106 is a master data store 108 that includes information about acceptable hardware and software configurations. Information indicative of the acceptable hardware and/or software configurations may be sent as an encrypted message 110 to the centralized configuration server 102 and stored in a centralized configuration data store 112. Thus, information about the various aircraft 104 may be compared to the information in the centralized configuration data store 112 to ensure the aircraft 104 is utilizing allowable hardware and/or software configuration settings without risking corruption of the original data on the master server 100 and the master data store 108.

The master server 100 may be associated with, controlled by, and/or owned by an original equipment manufacturer of the aircraft 104 within the fleet. The original equipment manufacturer has information related to the various systems and hardware of the aircraft 104 and thus can determine appropriate and acceptable software and hardware configurations for the aircraft 104. Such information may best stored, at least in part, in the master data store 108. In some instances, the acceptable software and hardware configurations for that aircraft 104 may be determined at least in part by an external agency, such as a regulatory or administrative agency. As an example, in the United States, the administrative agency may be Federal Aviation Administration. The master server 100 is disposed behind the firewall 106 to protect the master server 100 from outside interference. In this way, the software versions and information about allowable hardware and software configurations will not become corrupted. The master server 100 may then update or verify the information on the centralized configuration server 102 to ensure that the information thereon has not been corrupted or become outdated.

The firewall 106 is a system configured to prevent unauthorized access to a private network generally and/or the master server 100 specifically. It should be appreciated that while the firewall 106 illustrated in FIG. 1 is shown as a physical wall, the firewall 106 may be implemented as hardware, software, or a combination thereof. The firewall 106 is configured to prevent unauthorized messages from entering or leaving the intranet (e.g., the protected area including the master server 100). All messages and other information entering and leaving the intranet (such as encrypted message 110 or encrypted alert 120) must pass through the firewall 106. The firewall 106 may examine or otherwise analyze these messages and may block or quarantine messages that fail to meet any of various security criteria. In some embodiments, the firewall 106 may be a packet filtering firewall, a circuit-level gateway, a proxy server, a web application, or some combination thereof. The master data store 108 as well as other computing devices on the subnetwork may also be disposed behind the firewall 106.

The centralized configuration server 102 is disposed outside the firewall 106. In some embodiments, the centralized configuration server 102 may be referred to as a "demilitarized zone" ("DMZ") server. The demilitarized zone may be a physical and/or logical subnetwork associated with the network of the master server. The demilitarized zone is exposed to external security threats that would otherwise not pierce the firewall 106. This adds an additional layer of security to the master server (and other computing devices on that network) by allowing external communications without risking the secured master server. The centralized configuration server 102 is configured to freely communicate with various aircraft 104. The centralized configuration server 102 may be part of the Internet, such that it may be accessed remotely by any of various aircraft 104. In some instances, the centralized configuration server 102 may be located physically near the master server 100, but be outside the firewall 106 such that the centralized configuration server 102 can communicate directly with the internet (and by extension, other aircraft 104 that are associated with the Internet). In some embodiments, the centralized configuration server 102 may be co-located with the master server 100, with the firewall 106 being purely in software.

The aircraft 104 may include an onboard maintenance device 114, an onboard maintenance data store 116, and a wireless antenna 118. In some embodiments, the onboard maintenance device 114 may be a device dedicated to the maintenance and configuration of the other aircraft 104 systems and devices. In other embodiments, the onboard maintenance device 114 may be another aircraft 104 device, which performs the steps discussed herein in addition with other tasks for operating the aircraft 104. The onboard maintenance device 114 may be connected to the aircraft 104 via a vehicle area network, discussed below, such that the onboard maintenance device 114 is communicatively coupled with the various other computing devices of the aircraft 104. In some embodiments, the onboard maintenance device 114 is a stand-alone unit. In these embodiments, the onboard maintenance device 114 may be added to an existing aircraft 104 so as to add the functionality discussed herein. The onboard maintenance device 114 will instruct the various updates and configurations.

The onboard maintenance data store 116 may store any of various software updates and configurations that are received from the centralized configuration server 102. The onboard maintenance device 114 may then install or otherwise implement those updates and configurations within itself or within other aircraft systems.

The wireless antenna 118 may utilized one or more wireless communication methods, as discussed more below. The wireless communication may utilize an existing wireless communication device of the aircraft 104 or may utilize a dedicated wireless communication device (discussed more below). Typically, the wireless communication via the wireless antenna 118 will be used only intermittently or periodically during operation of the aircraft 104 (e.g., to send periodic reports on the configuration, as discussed below), but may be used extensively during maintenance of the aircraft 104 (e.g., to download software updates).

In some embodiments, the wireless antenna 118 may utilize satellite communication ("SATCOM"). In some instances, the SATCOM may be an existing SATCOM system on the aircraft 104, to which the onboard maintenance device 114 utilizes periodically, as discussed below. SATCOM systems allow the aircraft 104 to remain in contact with the centralized configuration server 102 while the aircraft 104 is in flight. This allows the centralized configuration server 102 to continue to verify the configuration of the aircraft 104 during flight. This can detect changes made by the operators during flight, so as to alert and correct any impermissible changes. This would not be possible utilizing a human to update the aircraft software.

In other embodiments, the wireless antenna 118 may utilize WiFi, or other wireless networking technology based upon the 802.11 family of standards. For example, WiFi may be utilized while the aircraft 104 is parked or otherwise non-operational. WiFi connections are typically only available over relatively short distances. As such, the software updates may be downloaded over WiFi in some embodiments, while the aircraft 104 is stationary in a hangar or at an airport.

In some embodiments, the wireless antenna 118 may utilize a mobile broadband connection. The mobile broadband connection has greater range and availability than WiFi, and as such may be available at certain airports and other locations in which WiFi is not available. In some embodiments, the communication element includes transponders for two or more systems and utilizes the appropriate one to perform the communication.

The onboard maintenance device 114 of the aircraft 104 communicates with the centralized configuration server 102 via electronic messages 120. Regardless of the type of wireless communication, the electronic messages 120 sent over the wireless antenna 118 may utilize transport layer security. Transport layer security is a cryptographic protocol designed to provide secure communications over a network or between networks.

It should be appreciated that the present disclosure discusses embodiments of the invention directed to aircraft 104. However, this discussed field of use is only exemplary. The systems and methods discussed herein may be utilized in any of numerous vehicles or other devices while being within the scope of the invention. Examples of other vehicles which may utilize embodiments of the invention include automobiles, boats, unmanned aerial vehicles, missiles. As long as these vehicles utilize various computing devices which run updatable and/or configurable software, similar techniques hardware components and techniques may be utilized to improve the updating and configuration of that software. It should therefore be noted that throughout the description, "aircraft" could be replaced by "automobile," "boat," or other similar word. Similarly, "pilot" or "maintainer" could be replaced by "driver," "operator," or other similar word. It should also be appreciated that the pilot may be interacting with systems described herein in some instances, where in other instances a maintainer may be present and interacting with the system. As such, the "pilot" could be replaced with "maintainer," "person," or other "user."

Exemplary Hardware

Figure 2A:
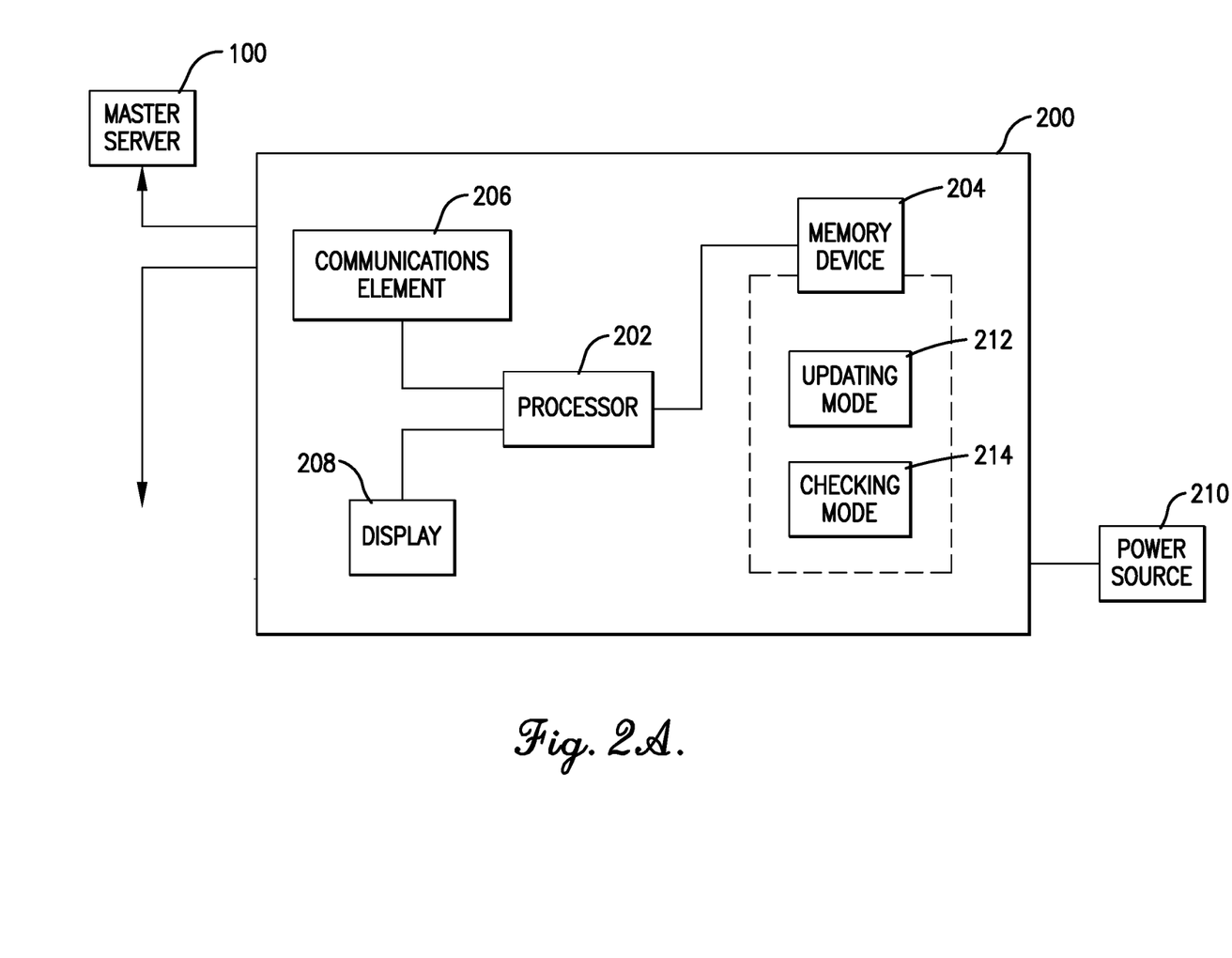
FIG. 2A is a schematic hardware diagram illustrating various hardware components of a centralized configuration server.
Figure 2B:
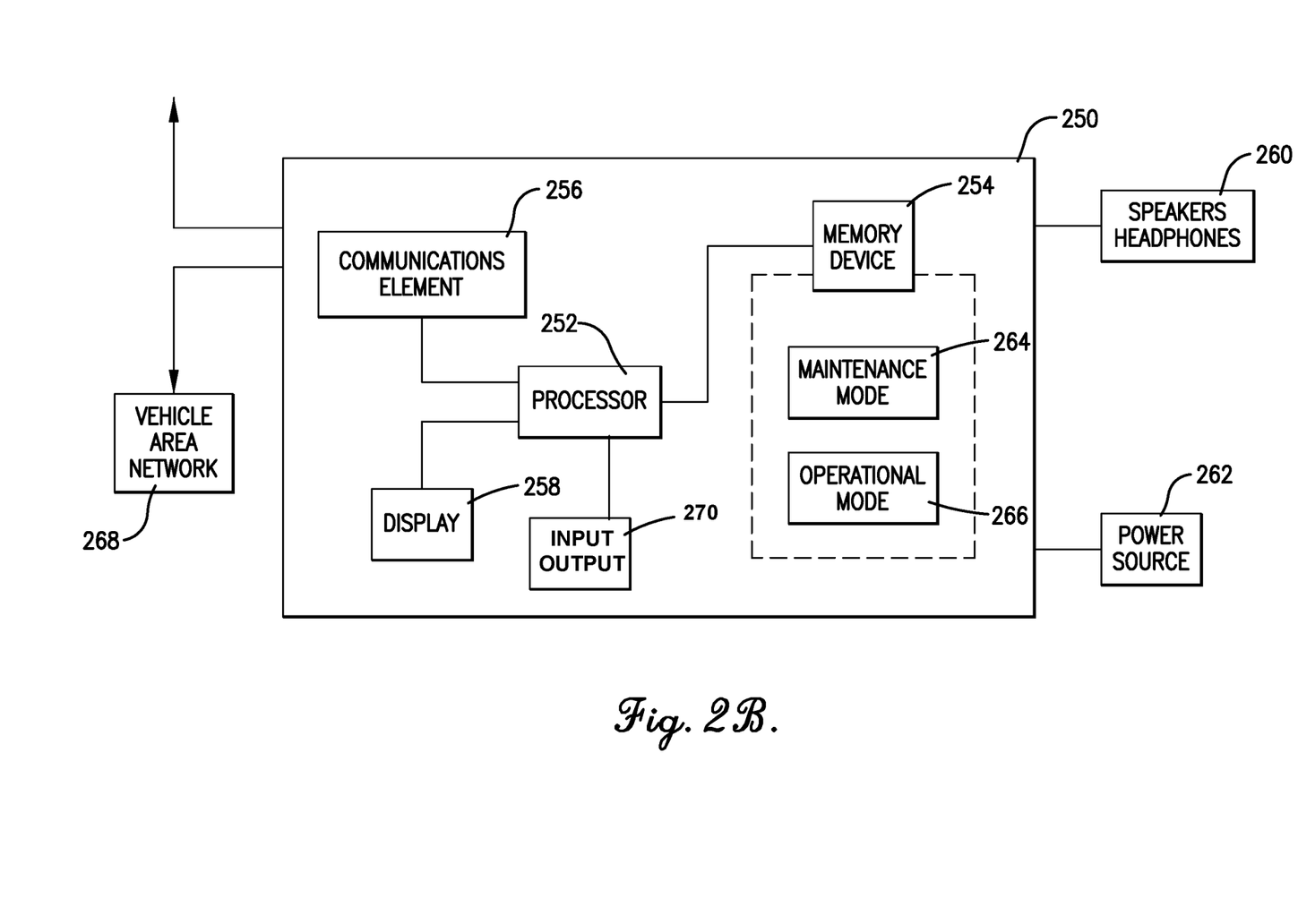
FIG. 2B is a schematic hardware diagram illustrating various hardware components of an onboard maintenance device.

Turning to FIGS. 2A and 2B, exemplary hardware of the centralized configuration server 102 and the onboard maintenance device 114 are shown, respectively. The centralized configuration server 102 will first be discussed. In some embodiments, the centralized configuration server 102 is a standard server computing device. In other embodiments, the centralized configuration server 102 is a specialized computing device configured specifically to perform the steps discussed herein. The centralized configuration server 102 serves as an intermediary between the master server 100, secured by the firewall 106, and the various aircraft computing systems, which may be disposed across a wide geographic area and across various computer networks. In embodiments of the invention, as shown in FIG. 2A, the centralized configuration server 102 comprises a housing 200, a processing element 202, a memory device 204, a communication element 206, and a display 208.

The housing 200 of the centralized configuration server 102 generally encloses and protects the components of the centralized configuration server 102. In some embodiments, the housing 200 may comprise a standard computer case or a standard server case. The housing 200 may interface with a power source 210 that is configured to provide electrical power to the centralized configuration server 102.

The processing element 202 of the centralized configuration server 102 may include one or more processors, microprocessors, microcontrollers, digital signal processors (DSPs), field-programmable gate arrays (FPGAs), analog and/or digital application-specific integrated circuits (ASICs), or the like, or combinations thereof. The processing element 202 may generally execute, process, or run instructions, code, code segments, software, firmware, programs, applications, apps, processes, services, daemons, or the like, or may step through states of a finite-state machine, or combinations of these actions. Machine learning techniques may also be implemented by the processing element 202. The processing element 202 may be in communication with the other electronic components through serial or parallel links that include address busses, data busses, control lines, and the like.

The processing element 202 of the centralized configuration server 102 may be configured to retrieve, process and/or analyze data stored in memory device 204, to store data in memory device 204, to replace data stored in the memory device 204, to analyze data or signals, send and receive messages, generate data, receive commands, control various functions of the systems, etc. In some configurations, the processing element 202 may consist of a single microprocessor or microcontroller. However, in other configurations, the processing element 202 may comprise a plurality of processing devices (e.g., microprocessors, DSPs, etc.), such that each processor is configured to control and perform different operational functions. For example, the first processor may be utilized to perform operational functions, such as analyzing the data received from the onboard maintenance device 114, and the second processor may control the analysis of the reported configurations for compliance.

The memory device 204 of the centralized configuration server 102 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. The memory device 204 may include, or may constitute, a "non-transitory computer-readable storage medium." The memory device 204 may store the instructions, code, code segments, software, firmware, programs, applications, apps, services, daemons, or the like that are executed by the processing element 202. The memory device 204 may also store settings, data, documents, sound files, photographs, movies, images, databases, and the like.

The memory device 204 is configured to store an updating mode program 212 and a checking mode program 214. The updating mode program 212 interfaces with the master server 100 to receive and maintain up-to-date configuration data, as discussed below. The checking mode program 214 compares the up-to-date configuration data of the received from the various onboard maintenance devices 114 among the various aircraft 104, as discussed below. These and other mode programs may be stored as executable instructions on the non-transitory computer readable storage medium. Upon execution by the processing element 202, the mode program instructs the processing element 202 to perform the steps discussed below.

The communication element 206 generally enables communication between the centralized configuration server 102, the master server 100, the onboard maintenance devices 114, and external systems or devices. The communication element 206 may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communication element 206 may establish communication wirelessly by utilizing radio frequency (RF) signals and/or data that comply with communication standards such as cellular 2G, 3G, or 4G, Institute of Electrical and Electronics Engineers (IEEE) 802.11 standard such as Wi-Fi, IEEE 802.16 standard such as WiMAX, Bluetooth™, or combinations thereof. In addition, the communication element 206 may utilize communication standards such as ANT, ANT+, Bluetooth™ low energy (BLE), the industrial, scientific, and medical (ISM) band at 2.4 gigahertz (GHz), or the like. The communication element 206 may be in communication with the processing element 202 and the memory device 204. In various embodiments, the centralized configuration server 102 may be configured to establish communication with more than one protocol or standard, and the communication element 206 310 may include a transceiver for each protocol or standard, such as Bluetooth™' Wi-Fi, cellular, etc., with which the centralized configuration server 102 can communicate. The communication element 206 may be in electronic communication with an antenna that wirelessly transmits and receives electronic signals to and from other electronic devices, such as a smartphone, a tablet, a laptop, or a desktop computer, or communication network interfaces such as a Wi-Fi router or a cell tower.

In some embodiments, the display 208 of the centralized configuration server 102 is configured to present information to a user thereof. In other embodiments, the centralized configuration server 102 may not include a display. In these embodiments, the master server 100 may include a display (not illustrated). The operator will update software and provide information about allowable configurations, which will then be sent to the centralized configuration server 102 through the firewall 106.

Turning to FIG. 2B, the onboard maintenance device 114 of the aircraft 104 will now be discussed in more detail. In embodiments of the invention, the centralized configuration server 102 is a stand-alone electronic device configured to be utilized within the aircraft 104. The centralized configuration server 102 may be mounted via various mounting hardware (not illustrated) such that the onboard maintenance device 114 is secure within the aircraft 104. In other embodiments (not illustrated) the onboard maintenance device 114 may be another computing device, such as another aircraft computing device, a smart phone, a tablet computing device, or a laptop computing device. In embodiments of the invention, the onboard maintenance device 114 comprises a housing 250, a processing element 252, a memory device 254, a communication element 256, a display 258. The onboard maintenance device 114 may interact with external displays, speakers/headphones 260, or other external systems.

The housing 250 of the onboard maintenance device 114 is configured to protect the internal components thereof from moisture, vibration, and impact. The onboard maintenance device 114 is, in embodiments, permanently installed within the aircraft 104. As such, the onboard maintenance device 114 is subject to the rigors of flight. In one embodiment, the housing 250 is a rugged housing. The housing 250 may be constructed from a suitable lightweight and impact-resistant material such as, for example, plastic, nylon, aluminum, or any combination thereof. The housing 250 may include one or more appropriate gaskets or seals to make it substantially waterproof or resistant. The housing 250 may take any suitable shape or size, and the particular size, weight and configuration of the housing 250 may be changed without departing from the scope of the present technology. In some embodiments, the housing 250 may include mounting hardware for mounting the onboard maintenance device 114 to the aircraft 104. The housing 250 may also interface with a power source 262 so as to receive electrical power for the powering of the internal electrical components of the onboard maintenance device 114.

The processing element 252 of the onboard maintenance device 114 may include one or more processors, microprocessors, microcontrollers, digital signal processors (DSPs), field-programmable gate arrays (FPGAs), analog and/or digital application-specific integrated circuits (ASICs), or the like, or combinations thereof. The processing element 252 may generally execute, process, or run instructions, code, code segments, software, firmware, programs, applications, apps, processes, services, daemons, or the like, or may step through states of a finite-state machine, or combinations of these actions. Machine learning techniques may also be implemented by the processing element 252. The processing element 252 may be in communication with the other electronic components through serial or parallel links that include address busses, data busses, control lines, and the like.

The processing element 252 of the onboard maintenance device 114 may be configured to retrieve, process and/or analyze data stored in memory device 254, to store data in memory device 254, to replace data stored in the memory device 254, to analyze data or signals, send and receive messages, generate data, receive commands, control various functions of the systems, etc. In some configurations, the processing element 252 may consist of a single microprocessor or microcontroller. However, in other configurations, the processing element 252 may comprise a plurality of processing devices (e.g., microprocessors, DSPs, etc.), such that each processor is configured to control and perform different operational functions. For example, the first processor may be utilized to perform operational functions, such as analyzing the data received from the centralized configuration server 102, and the second processor may control the implementations and updates so as to achieve compliance.

The memory device 254 of the onboard maintenance device 114 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. The memory device 254 may include, or may constitute, a "non-transitory computer-readable storage medium." The memory device 254 may store the instructions, code, code segments, software, firmware, programs, applications, apps, services, daemons, or the like that are executed by the processing element 252. The memory device 254 may also store settings, data, documents, sound files, photographs, movies, images, databases, and the like.

The memory device 254 is configured to store a maintenance mode program 264 and an operational mode program 266. The maintenance mode program 264 is configured to run during maintenance of the aircraft 104. The maintenance mode may be run by a pilot or other operator periodically, independent of flight of the aircraft 104, such as during other maintenance periods in which the aircraft 104 is powered on. The operational mode program 266 is run during standard operation of the aircraft 104, e.g., during the startup, taxiing, flight, and idling. The operational mode program 266 reports on the current configuration and software versions that are in use by the aircraft 104 and may receive confirmations or remedial actions to correct any deficiencies. Both these mode programs 264,266 are discussed in more detail below. These and other mode programs may be stored as executable instructions on the non-transitory computer readable storage medium. Upon execution by the processing element 252, the mode program 264,266 instructs the processing element 252 to perform the steps discussed below.

The communication element 256 generally enables communication between the onboard maintenance device 114 and the centralized configuration server 102. In some embodiments, the communication element 256 may further enable communication with a vehicle area network 268 as well as other external systems or devices, such as the master server 100. The communication element 256 may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communication element 256 may establish communication wirelessly by utilizing radio frequency (RF) signals and/or data that comply with communication standards such as cellular 2G, 3G, or 4G, Institute of Electrical and Electronics Engineers (IEEE) 802.11 standard such as Wi-Fi, IEEE 802.16 standard such as WiMAX, Bluetooth™, or combinations thereof. In addition, the communication element 256 may utilize communication standards such as ANT, ANT+, Bluetooth™ low energy (BLE), the industrial, scientific, and medical (ISM) band at 2.4 gigahertz (GHz), or the like. The communication element 256 may be in communication with the processing element 252 and the memory device 254. In various embodiments, the centralized configuration server 102 may be configured to establish communication with more than one protocol or standard, and the communication element 256 may include a transceiver for each protocol or standard, such as Bluetooth™, Wi-Fi, cellular, etc., with which the centralized configuration server 102 can communicate. The communication element 256 may be in electronic communication with an antenna that wirelessly transmits and receives electronic signals to and from other electronic devices, such as a smartphone, a tablet, a laptop, or a desktop computer, or communication network interfaces such as a Wi-Fi router or a cell tower.

The onboard maintenance device 114 may include or otherwise be associated with a speaker/headphone 260 and/or an audio-output device (not illustrated). The speaker/headphones 260 may directly deliver alerts of non-compliance, as discussed below. The audio-output device may utilize an external speaker or headphone. For example, the audio-output device may receive a jack for a set of headphones worn by pilot or other operator during flight. The information indicative of the alert of non-compliance may be delivered audibly the pilot or other operator via a set of headphones that the pilot would already be wearing during normal operation. As another example, the audio-output device may be a Bluetooth device which sends the audible recommendations to the speaker system of the aircraft 104.

The onboard maintenance device 114 may include an input/output interface 270 that may enable interaction between onboard maintenance device 114 and an external display (not illustrated), processing element, memory device and/or user interface associated with a secondary electronic device (e.g., associated with another aircraft computing system, etc.). In embodiments, an external display and user interface may be utilized by onboard maintenance device 114 to present compliance information and remedial action information on the external display. Onboard maintenance device 114 may not include a display 258 and may utilize an external display to provide alert information and provide user interface functionality. Onboard maintenance device 114 may supplement the functionality of the display 258 and user interface (discussed below) included in onboard maintenance device 114 with an external display, external processing element, and/or external memory associated with the secondary electronic device. For example, onboard maintenance device 114 may use input/output interface 270 to transmit various data (unprocessed, semi-processed or fully processed) to enable a secondary electronic device to provide user interface and/or visual or audible output functionality (using a display or speaker associated with the secondary device), processing functionality (using a processing element associated with the secondary device) or data storage functionality (using a memory element associated with the secondary device). In some embodiments, external components may be operable to perform any of the functionality associated with the various internal components described herein.

Exemplary Method Steps

Figure 3:
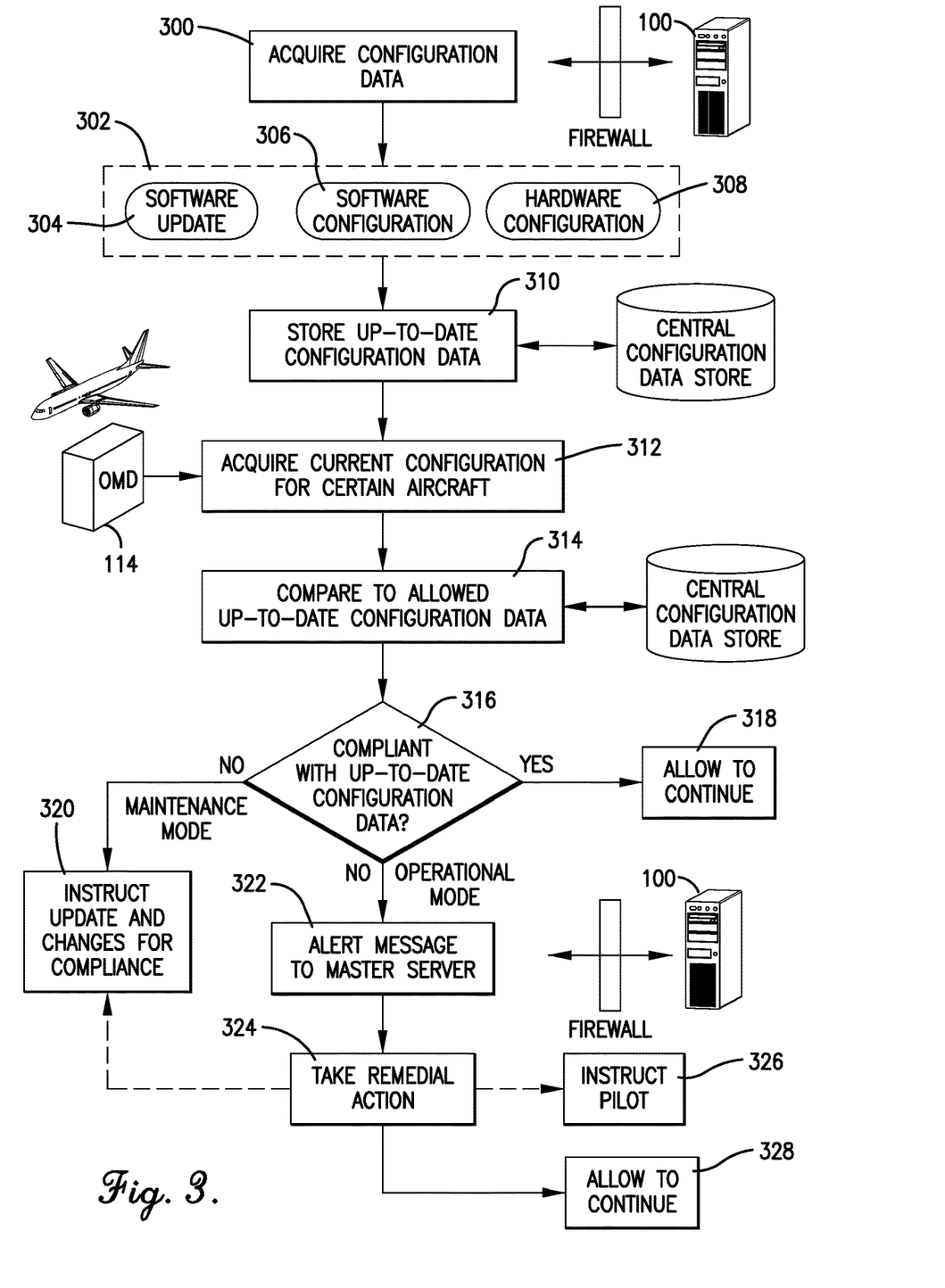
FIG. 3 is a flow diagram illustrating exemplary steps performed by the centralized configuration server.
Figure 4:
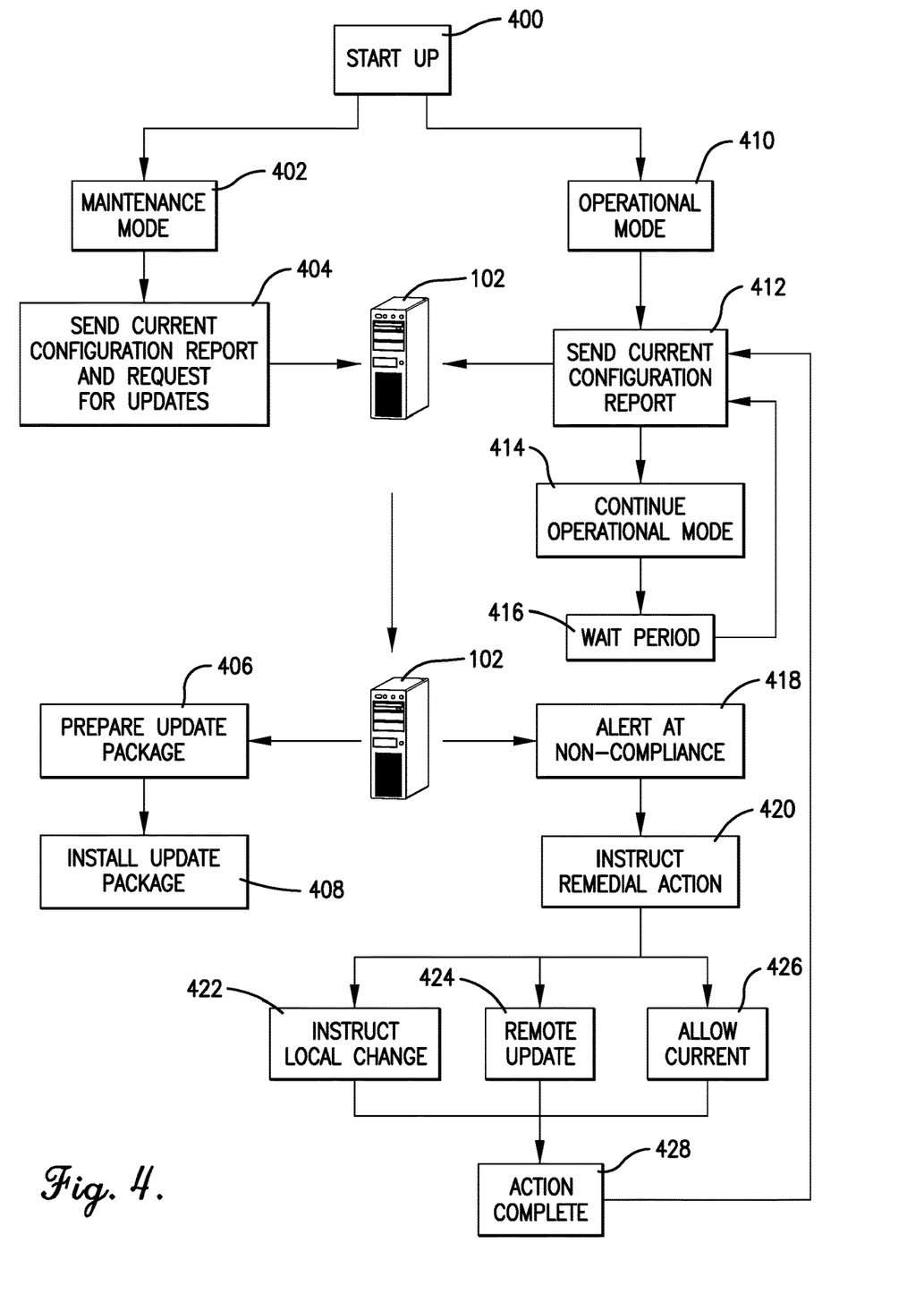
FIG. 4 is a flow diagram illustrating exemplary steps performed by the onboard maintenance device.

Turning now to FIGS. 3 and 4, an exemplary method performed by the above-discussed hardware components will now be described. Generally, the processing element 202 of the centralized configuration server 102 performs at least a portion of the steps shown in FIG. 3. Steps performed by the onboard maintenance device 114 of the aircraft 104 are shown below in relation to FIG. 4. Other steps may be performed by the master server 100, as well as other computing devices.

The centralized configuration server 102 performs various functions in order to obtain and maintain up-to-date configuration data for one or more type of aircraft 104. The centralized configuration server 102 will communicate that information, directly or indirectly, with various aircraft 104 in order to ensure that the aircraft 104 is utilizing allowable and/or optimized configurations and software versions. If one or more aircraft 104 is found to be out of compliance, the centralized configuration server 102 may send alerts to the master server 100 and/or the aircraft 104, instruct remedial actions, allow continued operations, or perform other steps.

In Step 300, the processing element 202 will acquire configuration data from the master server 100 via one or more encrypted messages 110. The master server 100 may generate the configuration data based upon input from an administrator or other user. As discussed above, in some embodiments, the master server 100 is controlled by, owned by, or otherwise associated with an original equipment manufacturer of the aircraft 104. The original equipment manufacturer will determine what hardware is compatible with the aircraft 104 (individually and/or in combinations), what software is compatible with the aircraft 104 (individually and/or in combinations), what software versions are the most current (which may include creating new software versions), and other aspects of the allowable hardware and software configurations. This information is sent to and/or requested by the centralized configuration server 102. As such, a copy or other representation of the configuration data is present outside the firewall 106 to allow for more easy access and comparison.

In Step 302, the processing element 202 will receive a set of up-to-date configuration data. The up-to-date configuration data includes one or more subsets of information. Three exemplary subsets of information are shown in FIG. 3 and discussed in more depth below. In some embodiments, the set of up-to-date configuration data is a complete set, including all of the allowable and current configuration data. This may be sent in case any of the existing up-to-date configuration data on the centralized configuration server 102 has become compromised or corrupted. In some embodiments, the set of up-to-date configuration data includes only updates or changes to the existing set of up-to-date configuration data. This will reduce the amount of information flowing between the master server 100 and the centralized configuration server 102. For example, only new software updates will be sent to the centralized configuration server 102.

In Step 304, the processing element 202 will receive software updates as a component of the set of up-to-date configuration data. Software updates may be complete versions of the up-to-date software, a patch (e.g., a set of changes to the software configured to update, fix, or improve that software), an executable file that will update the software, or other program or instructions. The software update may correct or improve security vulnerability, bugs, functionality, usability, and/or performance of the software. The software updates may also include routine updates, such as updates to maps, charts, and the like.

In Step 306, the processing element 202 will receive a set of software configurations as a component of the set of up-to-date configuration data. The software configurations may include any of the available software configurations that are allowed by the software being utilized by the aircraft 104. For example, a certain software may allow the operator to select certain information to be displayed and the manner in which that information is displayed. The set of software configuration may dictate certain configurations must be or must not be utilized. For example, if the operator has selected a display of data that does not include an altitude of the aircraft 104, the set of software configuration may dictate that the display include an altitude of the aircraft 104. Numerous other software configurations may be allowed, recommended, required, discouraged, or forbidden for a certain aircraft 104, even if they are allowed in the software generally.

In Step 308, the processing element 202 will receive a set of hardware configurations as a component of the set of up-to-date configuration data. the hardware configurations may include any of the available hardware configurations based upon the hardware present in the aircraft 104. In embodiments, the hardware configuration may deal with acceptable combinations of hardware, based upon compatibility of the hardware and software. For example, the hardware configuration may know the acceptable models or types of fuel sensor which a certain software can accurately read. If the fuel sensor present is not one of the allowed types, the set of hardware configuration may dictate that a new or different type of fuel sensor be used. Numerous other hardware configurations may be allowed, recommended, required, discouraged, or forbidden for a certain aircraft 104, even if they are already within the aircraft 104.

In Step 310, the processing element 202 will store at least a portion of the set of up-to-date configuration data in the centralized configuration data store 112. In this way, the processing element 202 saves at least a portion of the up-to-date configuration data for later comparison with specific aircraft 104 configurations.

In Step 312, the processing element 202 will acquire a set of current configuration data from the onboard maintenance device 114 of a certain aircraft 104. The set of current configuration data may be sent via transport layer security to the centralized configuration server 102. The set of current configuration data may include information related to one or more of the hardware and/or software configurations. The set of current configuration data may also include information about aircraft 104 (such as identifying information for the aircraft 104 and/or the operator, the make/model of the aircraft 104, the hardware present on the aircraft 104, the software versions being utilized, etc.), identifying information for the pilot or other operator, location information for the aircraft 104 (because some allowable/forbidden configurations may be location-dependent), and other information about the aircraft 104 and the configuration thereof.

In Step 314, the processing element 202 will compare the allowed set of up-to-date configuration data with the set of current configuration data from the onboard maintenance device 114 of the certain aircraft 104. This step may include accessing the centralized configuration data store 112 for the set of up-to-date configuration data. The processing element 202 will determine whether the various configurations reported comply with the set of up-to-date configuration data. For example, for a certain hardware device, the set of up-to-date configuration data may include a current software version. The processing element 202 may compare the reported software version reported in the set of current configuration data to the known current version from the set of up-to-date configuration data.

In Step 316, the processing element 202 will determine whether the set of current configuration data is compliant with the set of up-to-date configuration data. In some embodiments, the processing element 202 will determine a compliance score. The compliance score can be expressed in any of several forms. A first exemplary form may be a simple pass/fail designation. The pass/fail designation definitely states whether the system believes the aircraft configuration is compliant or not. In this and other forms, the system may presume that the aircraft 104 is compliant until a specific non-compliant configuration is identified. Another example of the pass/fail designation could be "proven to be compliant," "not proven to be compliant," and "proven to be non-compliant." For clarity, the steps discussed below will work of the simple pass/fail designation (e.g., the steps shown in FIG. 3 show a "YES" and a "NO" from step 316). In some embodiments, a severity or other score may dictate the further steps taken.

If the processing element 202 determines that the set of current configuration data is compliant with the set of up-to-date configuration data (based upon the pass/fail designation discussed above), in Step 318 the processing element 202 will allow the aircraft 104 to continue operations. If the aircraft 104 is in maintenance mode (discussed below), the processing element 202 may send (via the communication element 206) an encrypted message 120 that known updates or changes in the configuration are needed. If the aircraft 104 is in operational mode (discussed below), the processing element 202 may provide a confirmation as an encrypted message 120, or may perform no further steps (e.g., the aircraft 104 will presume that it is in compliance if no return message is received).

If the processing element 202 determines that the set of current configuration data is not compliant with the set of up-to-date configuration data, the processing element 202 may take any of various remedial actions. The various remedial actions taken by the processing element 202 (and or other external devices) may be based at least in part on a mode in which the aircraft 104 is operating, a severity level of the lack of compliance (e.g., the compliance score discussed above), the particular software or hardware system (or combination thereof) that is out of compliance, and/or other considerations.

In Step 320, if the aircraft 104 is in a maintenance mode (as discussed below), the processing element 202 will instruct updates and/or changes to the set of current configuration data so as to bring the aircraft 104 into compliance with the set of up-to-date configuration data. In some embodiments, this may include the creation and sending of an update package. The update package may include software patches and other recommendations on changes to the configuration of the aircraft 104. In other embodiments, the instruction for updates and changes may inform of the deficiencies and rely on the maintainer or other operator to take the remedial action.

In Step 322, if the aircraft 104 is in an operational mode (as discussed below), the processing element 202 may send an encrypted alert 120 to the master server 100 through the firewall 106. The encrypted alert 120 informs the master server 100 that an operational aircraft is out of compliance. This may allow the original equipment manufacturer (or other operator of the master server 100) to take appropriate remedial actions independent of the aircraft pilot and/or operator. For example, the original equipment manufacturer may independently contact the aircraft 104, an associated airport, an associated air traffic controller, or other party. This external action may be based upon a severity level of the alert and a current operational mode of the aircraft 104 (e.g., whether the aircraft 104 is in flight)

In Step 324, the processing element 202 may take or instruct various remedial actions to the aircraft 104. In some instances, the remedial action may include updates or changes for compliance, such as discussed above in Step 320. In Step 326, the processing element 202 may provide instructions to the pilot or other crew of the aircraft 104 to perform any of various actions. For example, if the remedial action includes changes to hardware (or the setting thereof), the instructions to make the change may be displayed on the display 258, audibly produced on the speakers/headphones 260, or otherwise communicated to the pilot or other operator.

In Step 328, the processing element 202 may allow the aircraft 104 to continue operations based upon the aircraft 104 coming into compliance with the set of up-to-date configuration data. In some embodiments, the remedial action may be delayed until the aircraft 104 is no longer in the operational mode. For example, the aircraft 104 may be using an older version of a certain software, but it would be unadvisable to update to a new version of the software during flight. In this instance, the remedial action may be partially or fully delayed until the aircraft 104 has landed, entered maintenance mode, or upon some other trigger.

Turning now to FIG. 4, exemplary steps performed by the onboard maintenance device 114 will now be discussed. As discussed above, the onboard maintenance device 114 may be a dedicated computing device configured for maintaining and updating the other computing systems of the aircraft 104. In other embodiments, the onboard maintenance device 114 may be another of the computing systems of the aircraft 104, which performs the steps discussed herein periodically along with other steps.

In Step 400, the processing element 252 of the onboard maintenance device 114 will start up. In some embodiments, the startup is a part of the standard startup procedure for the computing device. During the startup phase, the processing element 252 may automatically enter a default mode (which may be the maintenance mode or the operational mode). In these embodiments, the operator (such as the pilot) may interrupt the default mode and instead enter the other mode. For example, the operational mode may be default, but the operator may specifically enter the maintenance mode if the onboard maintenance device 114 is being powered on only for maintenance purposes. In other embodiments, the processing element 252 may present, to the user, an option on which mode to enter. In still other embodiments, the modes discussed herein may operate as background functions relative to other processes.

In Step 402, the processing element 252 enters the maintenance mode. The processing element 252 may enter maintenance mode by default, by special selection by the user, by special instruction from an external computing device (such as the centralized configuration server 102), based upon a certain time interval (for example, one week since the last running of maintenance mode), based upon a certain trigger, or upon some other criteria.

In Step 404, the processing element 252 sends a configuration report, which may include a set of current configuration data, to the centralized configuration server 102 as an encrypted message 120. This step may include a request for updates or some other indication that the onboard maintenance device 114 is in maintenance mode. The configuration report may include various information about the configuration of the aircraft 104 and the corresponding computer systems. Examples of information that may be included in the configuration report may include types of computer hardware present, types of non-computer hardware present, types of sensors present, types and versions of software running on the computer hardware, configurations and settings of the software running on the computer hardware, and other information. In some embodiments, this step includes encrypting the current configuration report in transport layer security or some other encryption protocol. In some embodiments, the sending of the current configuration report is done wirelessly.

In Step 406, the processing element 252 receives an update package from the centralized configuration server 102 as an encrypted message 120. The update package may include software updates. It should be appreciated that the software update originates from the master server 100 (which is behind the firewall 106) either directly (e.g., the software update was generated by the original equipment manufacturer or other controlling entity) or indirectly (e.g., the original equipment manufacturer acquires the software update from some external entity related to that software and/or hardware). In Step 408, the processing element 252 installs or otherwise implements the update package from the centralized configuration server 102.

In Step 410, the processing element 252 enters the operational mode. It should be appreciated that operational mode runs during the operation of the aircraft 104. This allows for the configurations to be periodically or continually checked during aircraft operation. Thus, any changes made to the aircraft 104 during operation (deliberately or inadvertently) can be discovered and verified independently of the pilot operation. This provides a distinct advantage over the prior art, in which a maintenance personnel will only occasionally physically visit the aircraft 104 and confirm the software versions and other configurations of the aircraft 104.

In Step 412, the processing element 252 sends a current configuration report, which may include a set of configuration data, to the centralized configuration server 102 as an encrypted message 120. It should be appreciated that this step is similar to Step 404 when the onboard maintenance device 114 is in maintenance mode. The current configuration report may include types of computer hardware present, types of non-computer hardware present, types of sensors present, types and versions of software running on the computer hardware, configurations and settings of the software running on the computer hardware, and other information.

In Step 414, the processing element 252 continues in operational mode, e.g., the aircraft 104 continues operations as normal. During operational mode, the aircraft 104 need not wait for the response from the centralized configuration server 102. Instead, the aircraft 104 will continue with normal operation until and unless an alert of non-compliance is received.

In Step 416, the processing element 252 waits for a certain interval period. Upon the completion of the interval period, the processing element 252 will send a subsequent current configuration report (e.g., the steps loop back to Step 412, as shown in FIG. 4). In some embodiments, the subsequent configuration report may include only changes to the software versions or configurations that took place during the interval period. In other embodiments, the subsequent configuration report may be a complete configuration report. As such the processing element 252 will remain in this loop of sending subsequent configuration reports periodically. The interval period may be chosen on various factors, such as the load on the network, the processing required in checking the current configuration reports, the number of aircraft 104 operating, etc. Examples of interval periods would be once per hour, once per half-hour, once per two-hours, etc. In some embodiments, instead of waiting for an interval period, the centralized configuration server 102 will send requests for a current configuration report upon an interval period determined based upon any of the above factors.

In Step 418, the processing element 252 receives an alert of non-compliance. The alert of non-compliance may be stored at least partially in the onboard maintenance data store 116. The alert of non-compliance informs the processing element 252 that the centralized configuration server 102, or some other external computing device, has identified a lack of compliance with the configuration report. In some embodiments, the alert of non-compliance is received via WiFi, SATCOM, mobile broadband or some other protocol. In some instances, the alert of compliance may be sent over a protocol different that the protocol over which the configuration report was sent. For example, an aircraft 104 may utilize WiFi while on the ground, but the alert of non-compliance may not be received until the aircraft 104 is already in the air, where the aircraft 104 utilizes SATCOM.

In Step 420, the processing element 252 instructs remedial action at least in part in response to the alert of non-compliance. The remedial action taken may depend upon whether there is a safety concern involved, as well as the current operation of the aircraft 104. For example, if a new software update is available for a certain hardware, but the updates improve performance or add features (not correct a safety issue, for example), the software update may be downloaded but marked for later installation. This is because the currently used software version is safe so the risk of changing during operation outweighs the benefits of improved performance or added features.

In some instances, in Step 422, the remedial action will include instructions for a local change. The local change may be to a hardware setting, a software setting, a hardware combination, a software combination, or other aspect capable of being locally changed. In some embodiments, the local change may be performed automatically by a computer system of the aircraft 104. In other embodiments, the local change may include an instruction or request for a task to be manually by the pilot or other operator. The instruction or request may be shown on the display 258, communicated via the speaker/headphone 260, be shown on some other display of the aircraft 104, or be otherwise communicated to the pilot or other operator.

In some instances, in Step 424, the remedial action will include a remote update. The remote update may be performed automatically by the onboard maintenance device 114. In some instances, the remote update will send a software update to be installed by the onboard maintenance device 114 or other computing device. In some instances, software updates will only be remotely updated while the aircraft 104 is not in flight. Based upon the software update and the computing device involved, remote updating during flight may be allowed.

In some instances, in Step 426, the remedial action will include allowing the current configuration at least in part. In this instance, the remedial action may include delaying other remedial actions to be taken. In other instances, the remedial action may include an instruction to order or otherwise obtain a new hardware component. As the new hardware component may not be readily available, the remedial action may include allowing the current configuration until the new hardware component can be acquired and installed.

In Step 428, upon the remedial action being completed or delayed, the processing element 252 will return to Step 412 so as to send a current configuration report. Thus, the onboard maintenance device 114 will remain in a loop of sending current configuration reports, receiving alerts of non-compliance, and implementing remedial actions to achieve compliance. Such a loop will continue as long as the aircraft 104 is in operating mode so as to identify configuration changes made during the flight and to ensure that the latest up-to-date configuration data is being utilized for comparisons. The processing element 252 will remain in this loop of periodically sending current configuration reports so long as the aircraft 104 is in operating mode, unless there is some contrary instruction.

Similarly, the master server 100 may perform steps including acquiring allowable up-to-date information; generating a set of up-to-date configuration data; sending the set of up-to-date configuration data to the centralized configuration server 102; and receiving alerts of non-compliance from the centralized configuration server 102 about one or more aircraft 104 being operational and out of compliance with the set of up-to-date configuration data. As discussed above, the master server 100 may be controlled or otherwise associated with an original equipment manufacturer of the aircraft 104. The master server 100 may thus receive various inputs from the original equipment manufacture regarding acceptable hardware, software, and the combinations thereof which may be utilized on the aircraft 104.

Although the technology has been described with reference to the embodiments illustrated in the attached drawing figures, it is noted that equivalents may be employed, and substitutions made herein without departing from the scope of the technology as recited in the claims.

Having thus described various embodiments of the technology, what is claimed as new and desired to be protected by Letters Patent includes the following:

What is claimed:

1. A system for updating and maintaining aircraft computing devices and software systems in an aircraft, the system comprising:
    a dedicated onboard maintenance device disposed in the aircraft and configured for maintaining and updating the aircraft computing devices and software systems in the aircraft;
    a centralized configuration server communicatively coupled with the onboard maintenance device via satellite communication,
    wherein the centralized configuration server is configured to wirelessly receive a current configuration report from the onboard maintenance device while the aircraft is in flight; and
    a master server disposed behind a firewall,
    wherein the master server is configured to send a set of up-to-date configuration data to the centralized configuration server,
    wherein the centralized configuration server includes a processing element configured to:
        compare the current configuration report of the aircraft to the set of up-to-date configuration data;
        determine, based upon said comparison, that the aircraft is not compliant with the set of up-to-date configuration data; and
        wirelessly send an alert of non-compliance to the aircraft, while the aircraft is in flight, instructing a remedial action;
    and wherein the onboard maintenance device is configured to run both a maintenance mode program that is executed during maintenance of the aircraft while the aircraft is not operating and an operational mode program that is executed during operation of the aircraft.

2. The system of claim 1, further comprising:
    a centralized configuration data store associated with the centralized configuration server, wherein the centralized configuration data store is configured to store the set of up-to-date configuration data for later analysis.

3. The system of claim 1, wherein the current configuration report is indicative of a current configuration setting of an electronic device on the aircraft in flight.

4. The system of claim 1, wherein the master server is operated by an original equipment manufacturer of the operating aircraft.

5. The system of claim 1, wherein the set of up-to-date configuration data includes an up-to-date software version for an electronic device within the aircraft.

6. The system of claim 5, wherein the remedial action includes the up-to-date software version to be installed on the electronic device within the aircraft.

7. The system of claim 1, wherein the onboard maintenance device is further configured to:
encrypt the current configuration report via transport layer security.

8. The system of claim 1, wherein the onboard maintenance device is further configured to:
prepare the current configuration report indicative of a current configuration setting of an electronic device;
wirelessly send the current configuration report to the centralized configuration server;
receive, from the centralized configuration server, an alert of non-compliance; and
take a remedial action based at least in part on said alert of non-compliance.

9. The system of claim 8,
wherein said current configuration report is a first configuration report,
wherein the onboard maintenance device is further configured to:
prepare, after waiting for a wait interval, a second current configuration report,
wherein the first current configuration report is distinct from the second current configuration report; and
wirelessly send the second current configuration report to the centralized configuration.

10. A computerized method for updating and maintaining computing devices and software systems of a fleet of aircraft, the computerized method comprising the following steps:
acquiring, from a master server, a set of up-to-date configuration data;
storing, in a centralized configuration data store, said set of up-to-date configuration data;
acquiring, from an aircraft before flight and in flight, a current configuration report indicative of a current configuration setting of an electronic device on the aircraft, wherein the configuration report is generated and sent by a dedicated onboard maintenance device disposed in the aircraft and configured for maintaining and updating the aircraft computing devices and software systems in the aircraft, wherein the onboard maintenance device executes both a maintenance mode program that is executed during maintenance of the aircraft while the aircraft is not operating and an operational mode program that is executed during operation of the aircraft;
comparing the current configuration report of the aircraft to the set of up-to-date configuration data;
determining, based upon said comparison, that the aircraft is not compliant with the set of up-to-date configuration data; and
wirelessly sending an alert of non-compliance to the operating aircraft instructing a remedial action.

11. The computerized method of claim 10, wherein the master server is operated by an original equipment manufacturer of the operating aircraft.

12. The computerized method of claim 10, further comprising:
retrieving, from the centralized configuration data store, a portion of said set of up-to-date configuration data.

13. The computerized method of claim 10, wherein the remedial action includes an instruction for a pilot action.

14. The computerized method of claim 10,
wherein the set of up-to-date configuration data includes an up-to-date software version for the electronic device within the aircraft,
wherein the remedial action includes the up-to-date software version to be installed on the electronic device within the aircraft.

15. A computerized method for updating and maintaining aircraft computing devices and software systems, the computerized method comprising the following steps:
entering an operational mode associated with an operational aircraft;
preparing a current configuration report indicative of a current configuration setting of an electronic device;
wirelessly sending the current configuration report to a centralized configuration server;
wherein the configuration report is generated and sent by a dedicated onboard maintenance device disposed in the aircraft and configured for maintaining and updating the aircraft computing devices and software systems in the aircraft, wherein the onboard maintenance device executes both a maintenance mode program that is executed during maintenance of the aircraft while the aircraft is not operating and an operational mode program that is executed during operation of the aircraft
receiving, from the centralized configuration server, an alert of non-compliance; and
taking a remedial action based at least in part on said alert of non-compliance.

16. The computerized method of claim 15, further comprising:
encrypting the current configuration report via transport layer security.

17. The computerized method of claim 15, wherein the current configuration report is sent via satellite communications while the aircraft is in flight.

18. The computerized method of claim 15, wherein the remedial action includes a remote software update.

19. The computerized method of claim 15, wherein the remedial action includes an instruction to the pilot to make a local change to said current configuration setting.

20. The computerized method of claim 15, wherein said current configuration report is a first configuration report, further comprising:
preparing, after a wait interval, a second current configuration report,
wherein the first current configuration report is distinct from the second current configuration report; and
wirelessly sending the second current configuration report to the centralized configuration server.

* * * * *